United States Patent [19]

Lewis

[11] 4,148,252
[45] Apr. 10, 1979

[54] FRUIT AND VEGETABLE PEELING MACHINE HAVING A ROTARY DRUM

[76] Inventor: John T. Lewis, 34 Sunnycrest Dr., Ottawa, Ontario, Canada, K2E 5Y2

[21] Appl. No.: 908,216

[22] Filed: May 22, 1978

[51] Int. Cl.² .......................... A23N 7/02; A47J 17/18
[52] U.S. Cl. .................................. 99/630; 241/278 A; 51/164 R
[58] Field of Search .......................... 99/627, 630, 631; 15/3.1, 3.12, 3.16, 21 A, 90; 17/43; 34/133, 139; 51/164; 68/140; 118/19; 134/153, 159; 241/278 A; 366/228

[56] References Cited

U.S. PATENT DOCUMENTS

| 2,052,548 | 9/1936 | Dorment | 99/630 |
| 2,210,584 | 8/1940 | Hileman et al. | 51/164 |
| 2,897,776 | 8/1959 | Black et al. | 118/19 X |
| 3,360,871 | 1/1968 | Wattenford | 34/139 |

FOREIGN PATENT DOCUMENTS

| 96110 | 10/1960 | Netherlands | 34/133 |
| 242026 | 11/1925 | United Kingdom | 99/130 |
| 637339 | 5/1950 | United Kingdom | 99/631 |
| 146618 | 8/1962 | U.S.S.R. | 99/631 |

Primary Examiner—Daniel Blum
Attorney, Agent, or Firm—Daniel Jay Tick

[57] ABSTRACT

A pair of spaced parallel rollers are rotatably mounted in the base part of a casing. A drum is positioned on the rollers and extends therebetween in parallel relation therewith. A third roller is rotatably mounted in a hingedly affixed cover part of the casing and abuts the drum in spaced parallel relation with the pair of rollers when the casing is closed so that the drum is rotated about its axis by an electric motor mounted in the base part of the casing and coupled to one of the pair of rollers. One end of the drum is open and covered by a cover. A sleeve coaxially removably mounted inside the drum for rotation with the drum has a plurality of sharp cutting projections extending from its inner surface so that fruits and vegetables in the sleeve during rotation thereof are peeled by the projections.

1 Claim, 3 Drawing Figures

FRUIT AND VEGETABLE PEELING MACHINE HAVING A ROTARY DRUM

BACKGROUND OF THE INVENTION

The present invention relates to a fruit and vegetable peeling device.

Fruit and vegetable peeling devices similar to that disclosed herein are described in the following United States patents. U.S. Pat. No. 1,034,144, issued July 30, 1912 to Rene, U.S. Pat. No. 1,234,767, issued July 31, 1917 to Junker, U.S. Pat. No. 1,979,615, issued Nov. 6, 1934 to Grayson, U.S. Pat. No. 2,161,032, issued June 6, 1939 to Formway, U.S. Pat. No. 3,186,457, issued June 1, 1965 to Dames and U.S. Pat. No. 3,242,958, issued Mar. 29, 1966 to Swart.

Objects of the invention are to provide a fruit and vegetable peeling device of simple structure, which is inexpensive in manufacture, used with facility, convenience and safety, dismantled and reassembled with facility, convenience and rapidity to permit cleaning, if desired, and functions efficiently, effectively and reliably to peel fruits and vegetables.

BRIEF DESCRIPTION OF THE DRAWINS

In order that the invention may be readily carried into effect, it will now be described with reference to the accompanying drawings, wherein.

DETAILED DESCRIPTION OF THE INVENTION

Figure 1:
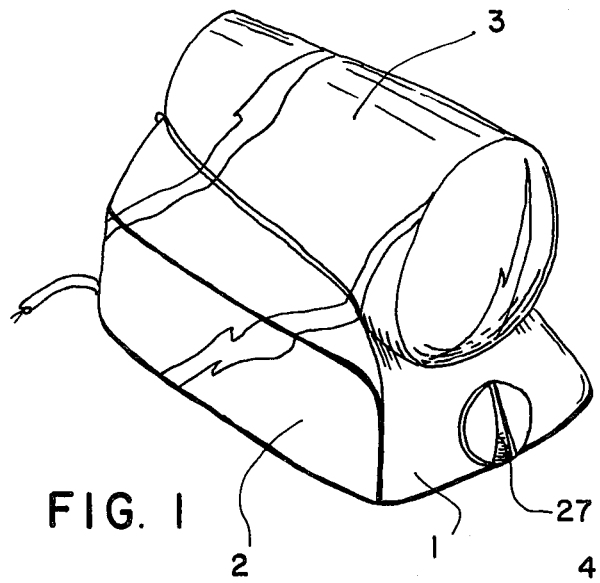
FIG. 1 is a perspective view of an embodiment of the fruit and vegetable peeling device of the invention.

The fruit and vegetable peeling device of the invention comprises a casing 1 having a base part 2 and a cover part 3 hingedly affixed to said base part to provide access to the interior of the casing. The cover part 3 is hingedly affixed to the base part 2 by any suitable hinge arrangement such as, for example, a pair of hinges 4 and 5 in spaced colinear relation, as shown in FIG. 2.

A pair of spaced parallel rollers 6 and 7 (FIG. 2) are rotatably mounted in the base part 2 of the casing 1.

Figure 2:
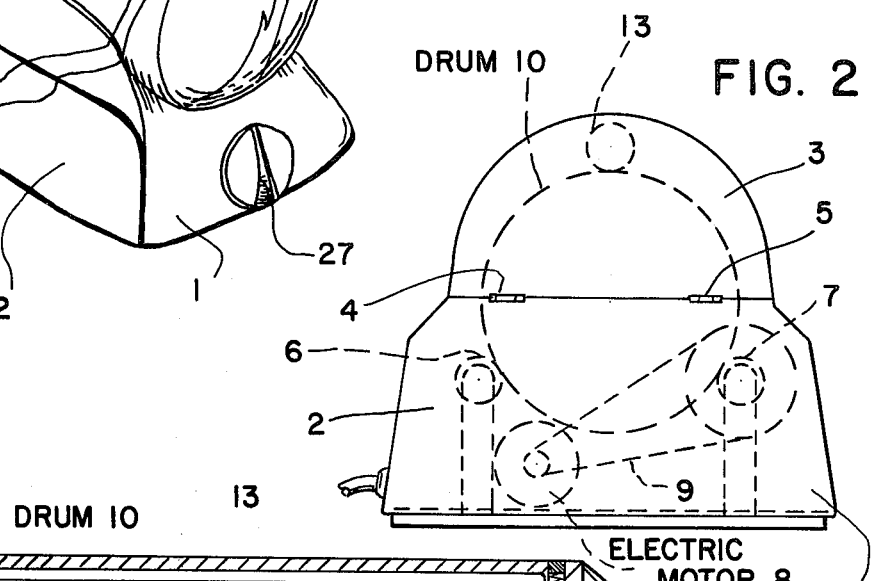
FIG. 2 is an axial rear view, on an enlarged scale, of the embodiment of FIG. 1.
Figure 3:
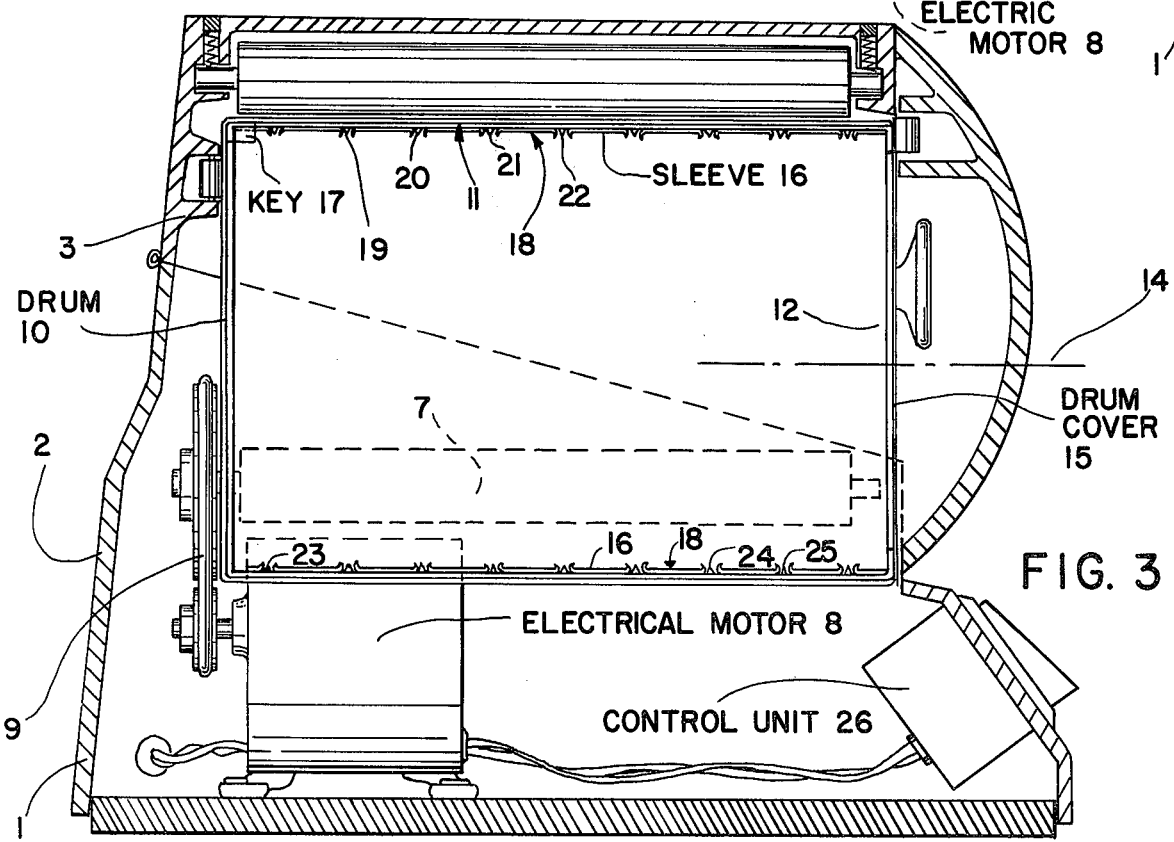
FIG. 3 is a view, on an enlarged scale, partly in section, of the embodiment of FIGS. 1 and 2.

An electric motor 8 is mounted in the base part 2 of the casing 1 and coupled to the roller 7, as shown in FIGS. 2 and 3, for rotating said roller. The motor 8 may be coupled to the roller 7 by any suitable means such as, for example, a gear train or a drive belt 9, as illustrated.

A drum 10 is positioned on the rollers 6 and 7, as shown in FIG. 2, and extends between said rollers in parallel relation therewith, as shown in FIGS. 2 and 3. The drum 10 has an inner cylindrical surface 11 (FIG. 3) and an open base end 12, as shown in FIG. 3.

A third roller 13 which is spring biased (FIGS. 2 and 3) is rotatably mounted in the cover part 3 of the casing 1 and abuts the drum 10, as shown in FIGS. 2 and 3, in spaced parallel relation with the pair of rollers 6 and 7 when the casing is closed, as illustrated. Thus, the drum 10 is rotated about its axis 14 (FIG. 3) by the motor 8 when the casing 1 is closed.

A cover 15 removably covers the open base end 12 of the drum 10, as shown in FIG. 3.

A sleeve 16 (FIG. 3) is coaxially removably mounted inside the drum 10 for rotation with said drum. That is, the sleeve 16 is preferably keyed to the inside surface of the drum 10 with the assistance, for example, of a key 17 (FIG. 3), so that said sleeve rotates with said drum. The sleeve 16 has an inner surface 18 with a plurality of sharp cutting projections 19, 20, 21, 22, 23, 24, 25, and so on, as illustrated in FIG. 3, extending form said inner surface. Thus, fruits and vegetables in the sleeve 16 during rotation thereof are peeled by the projections 19 to 25, and so on.

The motor 8 is controlled in speed by a control unit 26 (FIG. 3) which constitutes any suitable motor speed varying device such as, for example, a variable resistor and is manually operated via a knob 27 which is conveniently mounted outside the casing 1, as shown in FIGS. 1 and 3.

While the invention has been described by means of a specific example and in a specific embodiment, I do not wish to be limited thereto, for obvious modifications will occur to those skilled in the art without departing from the spirit and scope of the invention.

I claim

1. A fruit and vegetable peeling device, comprising
a casing having a base part and a cover part hingedly affixed to the base part to provide access to the interior of the casing;
a pair of spaced parallel rollers rotatably mounted in the base part of the casing;
an electric motor mounted in the base part of the casing and coupled to one of the rollers for rotating said roller;
A drum positioned on the rollers and extending therebetween in parallel relation therewith, said drum having an inner cylindrical suface and an open base end;
a third roller rotatably mounted in the cover part of the casing and abutting the drum in spaced parallel and opposed relation with the pair of rollers when the casing is closed whereby said drum is rotated about its axis by said motor when said casing is closed;
a cover removably covering the open base end of the drum; and
a sleeve coaxially removably mounted inside the drum for rotation with said drum, said sleeve having an inner surface and a plurality of sharp cutting projections extending from its inner surface whereby fruits and vegetables in said sleeve during rotation thereof are peeled by said projections.

* * * * *